Oct. 4, 1949. G. P. GIRARD 2,483,537
FISHING TACKLE DEVICE
Filed Feb. 19, 1948
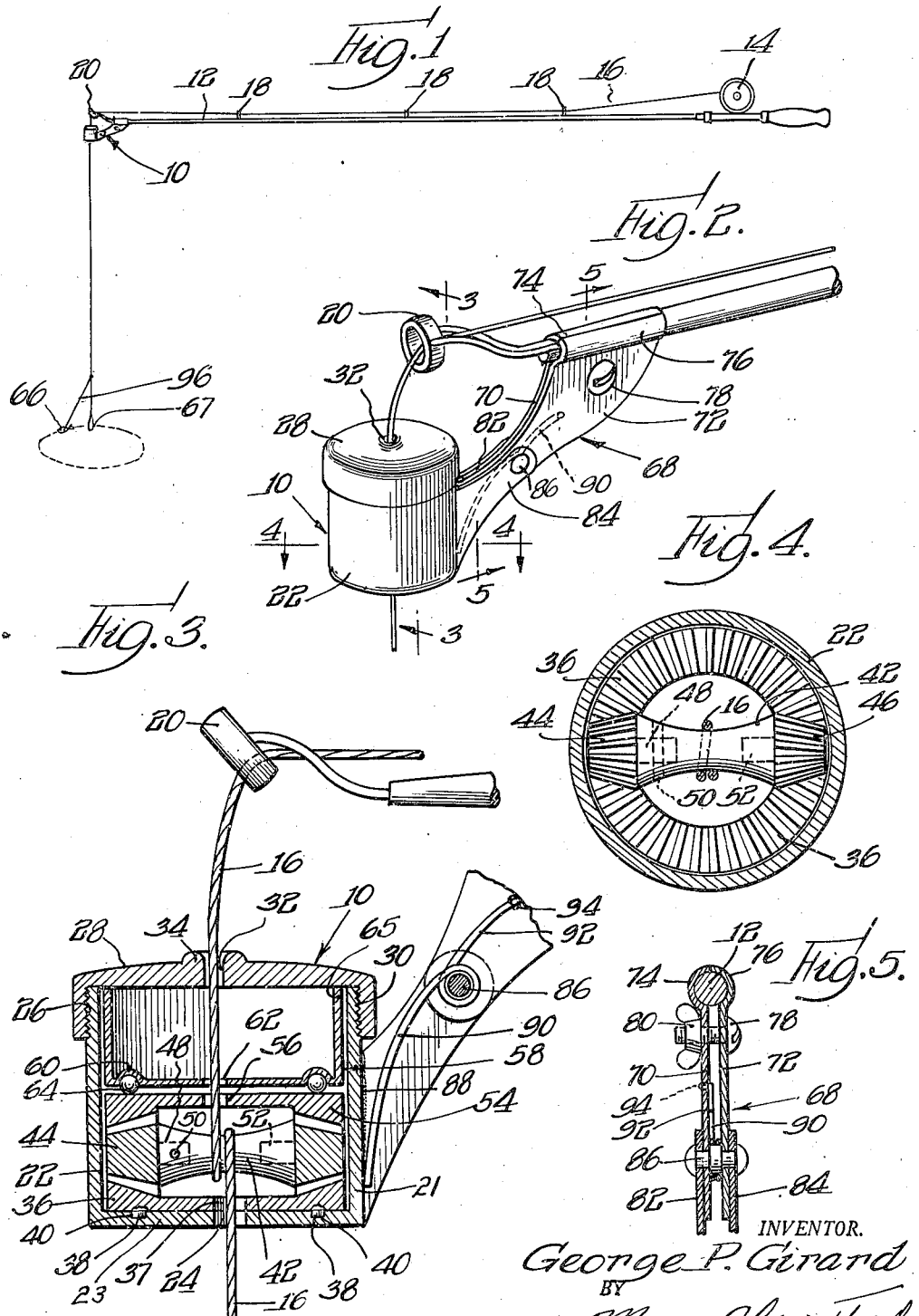
INVENTOR.
George P. Girard
BY
Moore, Olson & Trexler
attys.

Patented Oct. 4, 1949

2,483,537

UNITED STATES PATENT OFFICE 2,483,537

FISHING TACKLE DEVICE

George P. Girard, Chicago, Ill.

Application February 19, 1948, Serial No. 9,382

8 Claims. (Cl. 43—25)

This invention is directed generally to fishing apparatus and more specifically to a device for imparting movement to fishing lures.

The imparting of motion or movement to fishing lures and baits when submerged in the water to attract fish has led to the designing of special lures as well as to special rods and reels, many of them very complicated in construction and costly to manufacture. A study of these devices indicates that most of these improvements are directed to casting equipment alone, and for their operation are dependent upon the operation of a reel. Other devices depend upon motors or tensioned springs for their operation. These devices are necessarily involved and costly, and, furthermore, are not of interest to the average fisherman who does not have equipment adapted to accept these improvements with facility.

It is an object of the present invention to provide a fishing tackle device of the above described type which is readily installed as a unit on any fishing pole and may be used for still-fishing or casting for imparting movement to the fishing line or bait.

It is another important object of the invention to provide a piece of fishing tackle equipment of the type referred to above whose operation is independent of any other equipment.

It is still a further object of the present invention to provide a fishing tackle device of the type referred to above which imparts a rotary movement to the fishing cord about its longitudinal axis thereby causing the lure, immersed in water, to move in a desired orbital pattern to attract fish.

It is still another important object of the invention to provide a fishing tackle device of the type set forth above which may be produced inexpensively by simple and well known methods, and which contains a minimum of parts.

These and other objects of the present invention will be more fully understood by a study of the following description with reference to the accompanying drawing wherein:

Figure 1 is a side view showing a fishing rod, reel, cord and lure with the device of the present invention operatively positioned on the fishing rod;

Figure 2 is an enlarged, perspective view of the device contemplated by the present invention shown operatively positioned adjacent one end of a fishing rod;

Figure 3 is an enlarged, vertical, sectional view of the device shown in Figure 2 taken along the line 3—3 of Figure 2;

Figure 4 is an enlarged, horizontal, sectional view of the device taken along the line 4—4 in Figure 2; and Figure 5 is a sectional view taken on the line 5—5 of Fig. 2 showing the clamp arm used for mounting of the device contemplated by the present invention on a fishing rod.

Referring now to the drawing more in detail wherein like reference numerals have been used to designate like parts throughout the several views, it will be seen that the fishing tackle device of the present invention is designated generally by the numeral 10. Figure 1 shows the device 10 mounted on any type of fishing rod 12 adjacent one end. For purposes of disclosure the rod 12 is shown with a reel 14 mounted thereon. A fishing cord 16 is wound on reel 14 and extends through eyelets 18 mounted on the rod intermediate its ends, and then through eyelet 20 immediately adjacent the free end of the rod.

The device 10 for imparting movement to a fishing lure is best seen in Figure 3 and consists of a cup-shaped body portion or casing 22 comprising a cylindrical side wall 21 and an inturned annular flange or bottom 23, the latter having an aperture 24 therein to accept the fishing cord or line 16 and described later in detail. The body portion 22 is preferably made of a light material such as aluminum or plastic so that the weight of the device is kept to a minimum. Adjacent the open end or lip of the cup-shaped body portion 22, thread convolutions 26 are provided on the outer face to accommodate a cap member 28 having complementary internal thread convolutions 30. An aperture 32 is provided in the cap 28 to accommodate the fish line or cord 16 in a similar manner to the aperture 24 of body portion 22 previously described. The edges of aperture 32 should be rounded, as at 34, to reduce the wearing effect on the cord from repeated movement therethrough.

Mounted in the bottom of the casing 22 is a ring gear or gear plate 36 having a central aperture 37. This ring gear is provided with studs 38 which lie in corresponding recesses 40 provided in the face of the bottom surface of the body portion to retain the ring gear against rotation relative to the body portion. A drum or axle member 42 is diametrically positioned above the ring gear 36 with pinions or bevel gears 44 and 46 mounted at its free ends and in engagement with the ring gear. The pinion 44 is secured to the drum by means of a stud 48 and a cross pin 50. The pinion or bevel gear 46 is rotatably mounted to the drum by means of a stud 52.

The drum or axle member 42 is preferably recessed or concaved longitudinally to form a channel thereon to facilitate maintenance of the cord wound thereon in a position intermediate its ends.

Immediately above the drum member 42 with its associated gears 44 and 46 is a second ring gear 54 which lies in a plane parallel to ring gear 36 and engages the gears 44 and 46 in a similar manner. It is rotatably mounted relative to the body portion 22 for reasons described more in detail later. An aperture 56 is provided in registration with aperture 32 of cap member 28 to accept the cord 16.

Positioned in spaced relation to ring gear 52 is a cup-shaped member 58 having a plurality of recesses 60 and an aperture 62 in its bottom wall. Recesses 60 are provided to accept ball bearings 64 and hold them in spaced relation relative to each other and against the outer surface of ring gear 54. The outer edge surfaces of side walls 65 of member 58 are adapted to shoulder against the cap member 28. The cup-shaped member 58 serves to retain the pinions 44 and 46 in positive and operative engagement with ring gears 36 and 54, permitting the latter to rotate freely by reason of the ball bearing mounting, previously described.

The assembly and operation of the device heretofore described is as follows: The ring gear 36 is first placed in cup-shaped body member 22 and the pins or studs 38 associated with corresponding recesses 40. The cord 16 is then passed through apertures 24 and 37 of the body portion 22 and ring gear 36, respectively, and wrapped one or more times around the drum member 42. The drum member with associated pinions is then transversely positioned on the ring gear 36 and ring gear 54 mounted over the drum member. Cord 16 is then threaded through aperture 62 of cap member 58 and the cap member 58 with ball bearings 64 is then inserted into the body portion. Cap member 28 with the cord threaded through aperture 32 is then mounted on the body portion to retain the assembly in operable condition. Longitudinal movement of cord 16 over drum 42 causes rotation of the drum about its axis which in turn causes the pinion 44 secured thereto to walk on the ring gear 36 causing a rotation or revolving of the drum normal to the axis of the drum. This latter rotary or revoluble movement causes a rotation of cord 16 which in turn imparts an orbital movement to lure 66 attached thereto. It should be noted that longitudinal movement of the cord 16, either by a winding up of the reel 14 or by an unwinding of the reel caused by a weight or sinker 67 in the vicinity of the lure will produce the desired orbital movement or motion.

The means for mounting the device is shown at 68 and comprises two clamp arms 70 and 72 having oppositely arranged clamping jaws 74 and 76, respectively, adjacent one of their free ends. They are designed to be held together in clamping arrangement by means of a bolt 78 and a nut 80. A second set of arms 82 and 84 each have one of their ends pivotally connected to arms 70 and 72 by means of a rivet 86 or the like, and their opposite ends secured to the casing by welding, as shown at 88 in Figure 3, or in some other convenient manner. A spring arm 90 is wound or wrapped around rivet 86, the one end lying against the body portion and the other end having a hook-shaped configuration 92 anchored in an aperture 94 provided in arm 70. By this arrangement of parts, the device is maintained in operative position, but movable relative to the rod to accommodate forces directed in different directions to permit use of the device with the pole in any of a plurality of positions.

It has been found especially desirable to use a lure of the type shown in Figure 1 which comprises a lure 66 attached to the cord 16 by a wire leader 96 a distance above the free end of cord 16 where the sinker 68 is attached. This facilitates the obtaining of the orbital movement previously described.

It should be obvious to the reader that the cord 16 may be wrapped around the drum 42 as many times as desired, and that the greater the number of turns or wrappings about the drum, the better the line control for retaining the line relative to the device in any desired position.

While one embodiment of the invention has been shown for purposes of disclosure and description, it is to be understood that other embodiments and arrangements of parts coming within the spirit of the invention are contemplated, and that the invention is limited only insofar as the appended claims so limit it.

The invention is hereby claimed as follows:

1. A device for imparting movement to a fishing lure comprising a casing, means to mount said casing on a fishing rod or the like, a ring gear mounted in said casing, a drum member traversing said casing, and pinion mounted at each end of said drum member and each in operative engagement with said ring gear, said drum member being rotatable about its axis and revolvable about an axis normal thereto, said drum member arranged to accommodate a fishing cord and to rotate said fishing cord as an incident to longitudinal movement of said cord whereby an orbital movement is imparted to the lure attached adjacent the free end of said cord.

2. A device for imparting movement to a fishing lure comprising a casing, means to mount said casing on a fishing rod or the like, a ring gear mounted in said casing, a drum member traversing said casing, a bevel gear mounted at each end of said drum member and each in operative engagement with said ring gear, one of said bevel gears being non-rotatable relative to said drum member, and means to retain said bevel gears in engagement with said ring gear, said drum member being rotatable about is axis and revolvable about an axis normal thereto, said drum member arranged to accommodate a fishing cord, and said drum member being rotatable as an incident to longitudinal movement of said cord whereby an orbital movement is imparted to the lure.

3. A device for imparting movement to a fishing lure comprising a casing, means to mount said casing on a fishing rod or the like comprising an arm extending from said casing, a second arm pivotally connected to said first arm and having means adjacent its other end to clampingly engage the fishing rod or the like, and spring means to retain said casing in operative position, and a drum member traversing said casing, said drum member being rotatable about its axis and revolvable about an axis normal thereto, and said drum member arranged to accommodate a fishing cord and to be rotated as an incident to longitudinal movement of said cord to impart an orbital movement to the lure.

4. A device for imparting movement to a fishing lure comprising a casing, a pair of superposed ring gears mounted in said casing, one of said ring gears being fixed relative to said casing, and a drum member traversing said casing and mounted between said ring gears, said drum member being rotatable about its axis and revolvable about an axis normal thereto, and said drum member arranged to accommodate a fishing cord and to be actuated as an incident to longitudinal movement of said cord thereby imparting an orbital movement to the lure.

5. In a device for imparting movement to a fishing lure of the type described in claim 4, wherein said drum member is longitudinally recessed to facilitate positioning of the fishing cord intermediate the ends of said drum member.

6. A device for imparting movement to a fishing lure comprising a cylindrical casing having an inturned annular flange adjacent one end, a pair of oppositely arranged ring gears, a rotatable drum member mounted between said ring gears, means to retain said ring gears in operative engagement with said drum member, and means to mount said cylindrical casing on a fishing rod or the like, said drum member arranged to accommodate a fishing cord about its periphery, and said drum member being rotated about its axis and revolved about an axis normal thereto as an incident to longitudinal movement of said cord whereby an orbital movement is imparted to the lure.

7. A device for imparting movement to a fishing lure comprising a casing, a pair of superposed ring driving surfaces mounted in said casing, one of said ring driving surfaces being fixed relative to said casing, and a drum member traversing said casing and mounted between said ring driving surfaces, said drum member being rotatable about its axis and revolvable about an axis normal thereto, and said drum member arranged to accommodate a fishing cord and to be actuated as an incident to longitudinal movement of said cord thereby imparting orbital movement to the lure.

8. A device for imparting movement to a fishing lure comprising a casing, means to mount said casing on a fishing rod or the like, a ring driving surface mounted in said casing, a drum member traversing said casing, and a rotary drive member mounted at each end of said drum member and each in operative engagement with said ring driving surface, said drum member being rotatable about its axis and revolvable about an axis normal thereto, said drum member arranged to accommodate a fishing cord and to rotate said fishing cord as an incident to longitudinal movement of said cord whereby an orbital movement is imparted to the lure attached adjacent the free end of the cord.

GEORGE P. GIRARD.

REFERENCES CITED

The following references are of record in the file of this patent:

UNITED STATES PATENTS

| Number | Name | Date |
|---|---|---|
| 1,052,423 | Prentice | Feb. 4, 1913 |
| 1,465,707 | Bartholomew | Aug. 21, 1923 |